Patented May 15, 1934

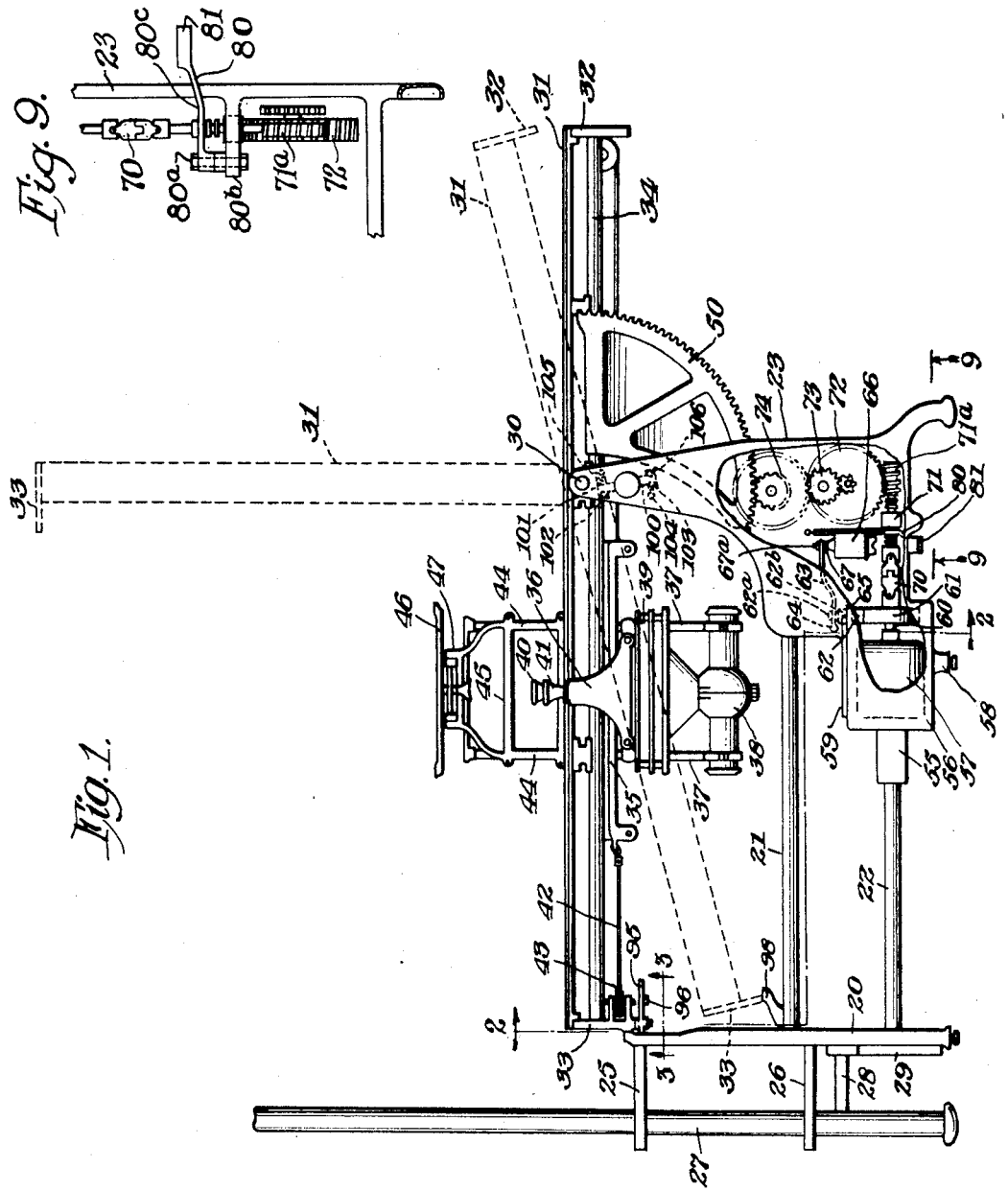

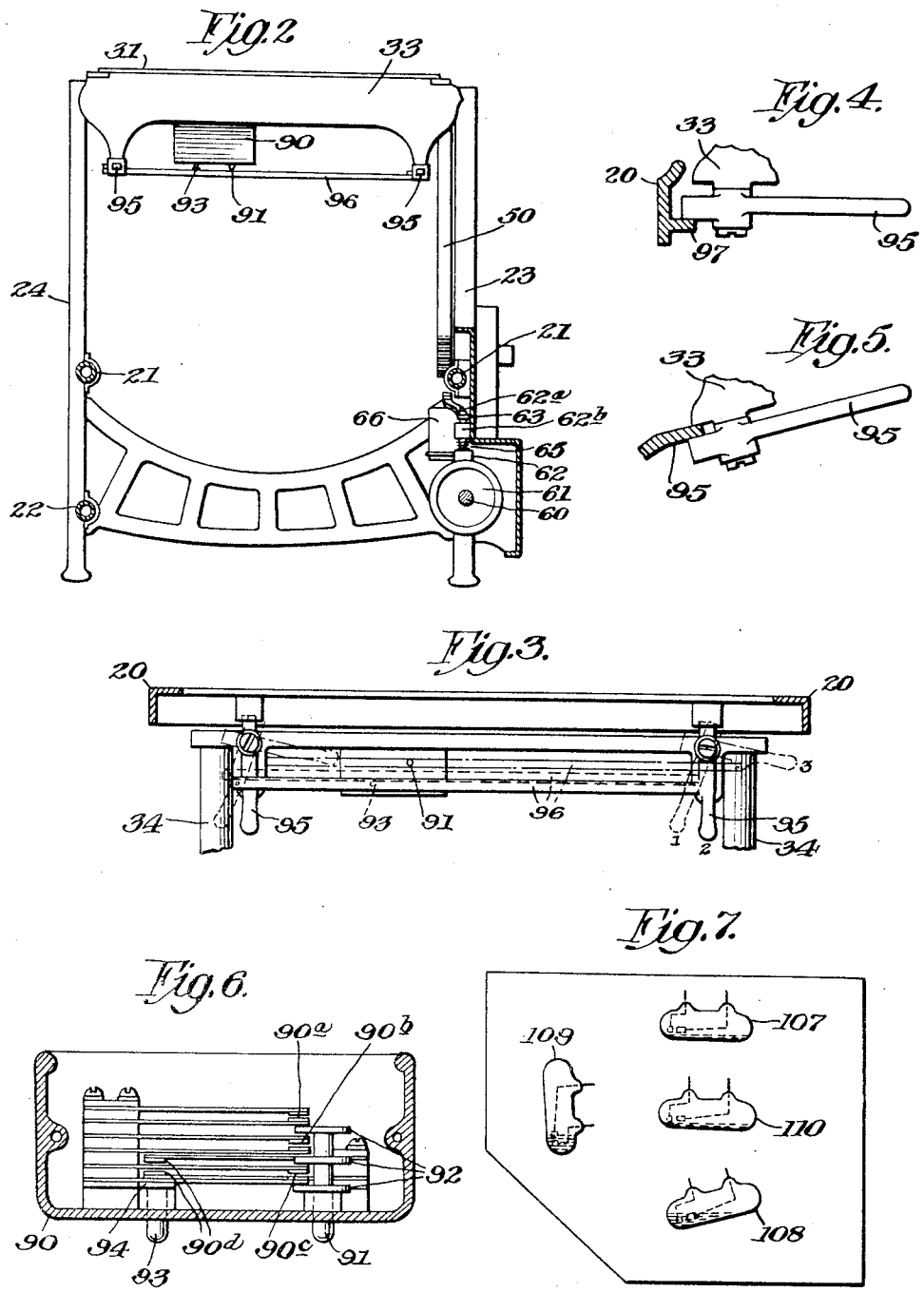

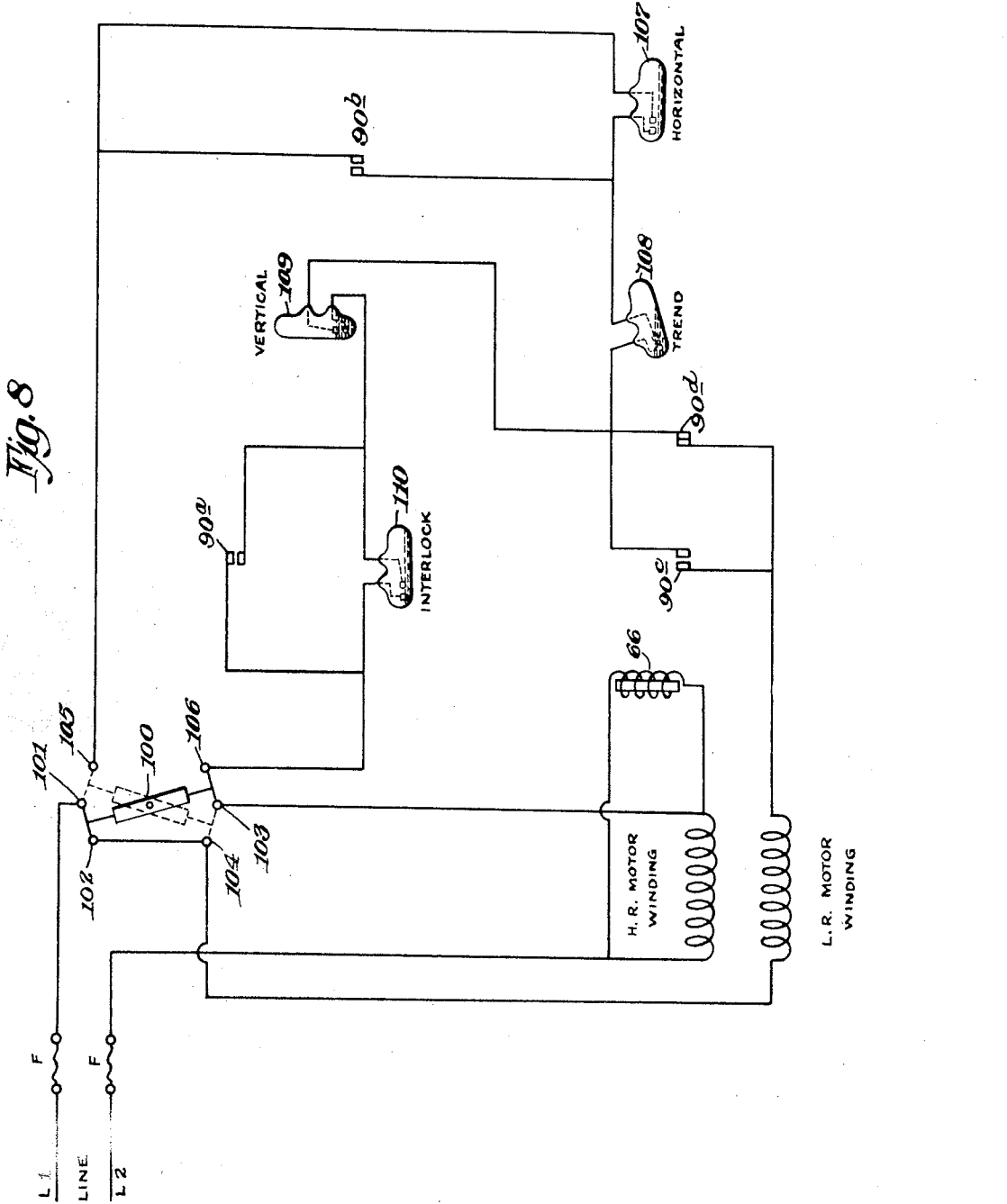

1,958,555

UNITED STATES PATENT OFFICE 1,958,555

X-RAY TABLE

Julius B. Wantz, Chicago, Ill., assignor to General Electric X-Ray Corporation, Chicago, Ill., a corporation of New York Application August 28, 1926, Serial No. 132,117

3 Claims. (Cl. 250—34)

The present invention relates to an X-ray table of a new and improved type, the top or movable portion of which is adapted to be moved into position by an electric motor.

A motor driven X-ray table is not an altogether new article of manufacture. There has been a suggestion for such table in medical circles, but the X-ray art fails to disclose any mechanically perfect structure of this nature, or any device which has been efficient in its manipulation or which could be conveniently employed by a radiologist.

Apparently, heretofore, the idea of X-ray engineers and equipment designers has been to build a table about or around a motor. This is manifestly an illogical way of building a table or any other device which is mechanically actuated. The present invention has approached the problem from a different point of view and comprises a motor built into a table and adapted to permit of its operation to adjust such table with the same facility with which the conventional table may be manually manipulated.

Means are provided to eliminate mechanical operation and to convert the table into a manually operable device without the hindrance of the motor equipment.

Included among the objects of the present invention, are the following:—

An improved table structure providing means for housing a prime mover and gears for transferring the motive force of such prime mover to such table in a regulated and instantly controlled manner;

A novel arrangement of gears intermediate a table and a prime mover and adapting said table to be manipulated in substantially the same manner as a manually actuated device;

Unique means for disconnecting a prime mover for actuating a table, and the gears driven thereby, whereby such motor driven table may be instantly converted into a manually operable apparatus;

An unique connecting means intermediate a motor and a table whereby the movements of such table are accurately controlled by such motor, such connecting means including an instrumentality for disconnecting such motor from said table to render the table manually operable;

An unique housing for a motor and for gears associated with such motor for driving a table whereby the mechanically operated parts of the apparatus are adapted to form one leg of the table;

The provision of novel circuits in association with a motor driven table whereby such table may be positively and accurately halted in an horizontal position, in a vertical position, in the Trendelenberg position, or at any intermediate position between the Trendelenberg position and the vertical;

New and novel means for providing a large arc through which a motor driven X-ray table may operate, with positive and predeterminable stops in certain frequently employed positions;

Novel circuit connections in association with a table top adapted to move about a horizontal axis whereby the movements of such table are positively arrested at certain predetermined positions, the table being adapted to be controlled so that it will operate through a plurality of different combinations of positions by the arrangement of such circuits;

The combination with a motor driven table of automatic switching means for preventing movement of the table beyond certain positions, one or more of which is wholly within the arc of movement of the table;

The combination with a motor driven table of an automatically actuated switch member and of circuit breaking means for definitely determining the movements of such table and for limiting such movements between well defined useful positions;

An unique controlling means in association with a table and having a plurality of operating circuits whereby predetermined movements of said table may be obtained, and movement beyond such predetermined points avoided; and a novel electric system of circuits and switches adapted to be both automatically and manually controlled in combination with a motor driven table and adapting said table to be moved through a plurality of predetermined angles, the opening and closing of such switches providing means for stopping said table in predetermined positions automatically and manually.

These objects, and such other objects as may hereinafter appear, are obtained by the novel combination of the elements hereinafter described, by their arrangement, and by their particular construction. One form of the invention is illustrated in the accompanying drawings hereby made a part of this specification.

In said drawings:—

Figure 1 is a side elevation of a table embodying the invention, the table top being shown in heavy lines in its horizontal position and in dotted lines in the vertical and Trendelenberg positions. A portion of the casing forming a part of one leg of the table is broken away to show the clutch and gear mechanisms housed upon said leg.

Figure 2 is a vertical section on the line 2—2 of Figure 1 looking in the direction of the arrows.

Figure 3 is a horizontal section on the line 3—3 looking in the direction of the arrows, the table top being represented by a fragmentary portion thereof.

Figure 4 is a detail, partly in section showing one of the locking members of the table top in engagement with the table frame when the table top is in horizontal position.

Figure 5 is a similar detail showing the position of the locking member with respect to such frame when the table top is locked in the Trendelenberg position.

Figure 6 is a vertical section through the contact box disclosing the arrangement of the contacts therein and the actuating means therefor.

Figure 7 is a detail, somewhat diagrammatic in its form, showing the mercury contact switches employed upon the gear segment of the table for the purpose of making and breaking the several circuits of the prime mover.

Figure 8 is a diagrammatic representation of the electric circuits in use upon the table.

Figure 9 is a fragmentary view of the under side of the device taken on the line 9—9 of Figure 1 and looking in the direction of the arrows.

Like reference characters are used to designate similar parts in the drawings and in the description of the apparatus which follows.

Reference should be had first to Figure 1. A table stand or support having a vertical U-shaped frame member 20, oppositely disposed and horizontal bar and tube members 21 and 22, and vertical legs 23 and 24, is disclosed. The particular character of the frame work is not material to the success of the invention.

Depending from the frame member 20 and spaced therefrom by horizontal arms 25 and 26 are two uprights 27, which uprights are hollow and provide insulating conduits for the lead-in wires for high tension current to be used in energizing a tube to be used with and forming a part of the apparatus when in operation. Such lead-in wires are not shown but the arrangement is conventional.

Members 28, of which there are two, form additional parts of the insulating system, forming conduits for the high tension wires whereby to bring them into close proximity to the X-ray tube, and member 29 is a yoke or separator forming part of the cross members of frame member 20 and separating conduits 28 one from another.

The leg 24 may be of any desired configuration or form, and it may be, generally, of any conventional type. No part of the motor or gears for operating the table or of the wiring required for the operation and control of the table is dependent thereupon. The function of such leg merely is to provide an axial support for one side of the table and to lend strength and rigidity to the table stand or frame.

Intermediate and supported by the legs 23 and 24 is a trunnion 30 which forms the main support for the table top generally. Except in certain positions, it is the sole support for such top.

Such table top comprises a patient's support 31, which is generally flat and of suitable material, end members 32 and 33, and longitudinal track members 34. Said track members are generally two in number and are at opposite sides of the table top.

Mounted upon said track members 34 for free movement therealong is a carriage 35 having a section slidable transversely of the table top, such slidable portion being provided with a projecting bracket or arm portion 36. The bracket or arm portion 36 provides means for moving the carriage 35, to which it is rigidly attached, longitudinally along the tracks 34 and at the same time adjusting the slidable portion of the carriage transversely.

Depending from a transversely adjustable portion of the carriage 35 and supported thereon by brackets 37 is an X-ray tube which is contained within a cover or shell 38, preferably of material opaque to X-rays, and having a portion either open, or transparent to X-rays, through which the X-light may pass to the patient's support 31 which is of a material transparent to X-rays or offering slight resistance to their passage.

Intermediate the tube and the table top 31 and forming a part of the transversely slidable portion of the carriage 35, is a shutter mechanism 39 adapted to be controlled by handles 40 and 41 conveniently mounted in bracket 36. A construction such as here has been described comprising a carriage having a transversely adjustable section, supports for a tube, tube covering portions, and a shutter, is conventional in the X-ray art. It forms a part of the invention to the extent that it is a part of the combination disclosed therein.

The carriage 35 is ordinarily provided with a counter-balancing weight slidable upon the table top in a direction opposite to the movement of the carriage thereon, as is conventional in the art, weight cords 42 and the pulleys 43 about which such weight cords move being clearly illustrated in Figure 1.

Above the table and extending thereover and supported upon arms 44 having a transverse cross member 45 is a fluoroscopic screen 46, said screen being suitably mounted upon brackets 47 which extend across the table top 31 and permit the screen 46 to normally occupy a position about midway from the sides of said table top 31. The arms 44 are disposed upon transversely adjustable section of the carriage 35 and are conjointly moved with the bracket 36.

For the purpose of describing the present invention, greater details of the construction of the carriage, the tube support, and the fluoroscopic screen are believed unnecessary for the invention resides not in the details of these parts, but more particularly in the mechanism for driving the table top upon which these mechanisms are disposed. Any suitable tube support and fluoroscopic screen may be substituted for the ones illustrated.

Disposed upon the one of the side members, or tracks 34, as shown in Figure 1, is a gear segment 50. This segment comprises an arcuate marginal portion having teeth, end members, one of which is parallel with and attached to said track member 34 and an intermediate brace member. The marginal contour and relative position of member 50 is such that it corresponds to a segment of circular gear having its axis of revolution coincident with the axis of revolution of the trunnion 30.

As has been previously pointed out, the leg 23 comprises generally a casting or otherwise formed casing or part providing a housing for gears and for the prime mover driving such gears.

The horizontal member 22 is joined to a lug portion 55 upon the housing part of leg 23. Said lug portion extends horizontally away from a motor housing on said leg designated 56. A motor 57 is disposed within said housing 56, and for the purpose of providing additional support for this portion of the leg 23, a foot 58 is provided. The upper flat portion of the houing 56 is covered by a foot plate 59, the housing 56 forming a convenient step up for a patient in getting upon the table and a rest for one of the operator's feet while manipulating a patient upon the table top 31, or during the examination of said patient.

Disposed upon a shaft 60, driven by motor 57, is a disc member 61, which member is adapted to be frictionally engaged by a shoe 62 having a reciprocating pin mounting 62a passing through a bracket 62b. The end of said mounting 62a is secured to an arm 63 pivoted at one end 64. A spring 65 normally urges the shoe 62 toward the disc 61 so that unless lifting force is applied to the lever 63, there is braking force present, such braking effect arresting rotation of motor 57.

For moving the arm 63 to lift the shoe 62 away from the wheel 60, a solenoid 66 and armature 67 are employed. These are contained in a suitable casing and the armature is joined to lever 63 at 67a. Current in the solenoid 66 forces the armature 67 upwardly and this releases the shoe 62 from disc 61.

Also secured between said shaft 60 and a short worm shaft 71 is an universal point 70. Said worm shaft extends from the universal joint 70 (in a right hand direction in Figure 1) and engages a train of gears 72, 73 and 74, a worm 71a is secured on worm shaft 71 to engage the gear 72. The gear 74 meshes with segment 50, and gear 73 is disposed intermediate gears 72 and 74. As is manifest from an examination of the drawings, the gears 72, 73 and 74 are for the purpose of reduction, so that the speed of the table top 31 is such that it is adapted to be moved rather slowly by the rapidly rotating motor 57.

Connected with the worm shaft 71 is a foot lever 80 having an end pivoted by means of a bolt 80a to the end of a bracket 80b projecting inwardly from the leg 23. Said lever 80 has an eye or bearing portion 80c intermediate its ends and in which the shaft 71 freely rotates.

At its outermost end, the lever 80 comprises a pedal 81. Downward and inward pressure upon said pedal 81 forces the worm shaft 71 out of horizontal alignment with shaft 60 and downwardly out of engagement with the gear wheel 72.

In this manner, the table top 31 is released from mechanical control, and is adapted to be operated manually so long as gear 72 is out of mesh with worm 71a. The operation of the top is then free from any resistance of the motor or of the brake member in association therewith. Release of the pedal 81 permits the worm 71a to re-engage the gear 72 and converts the table again into a motor driven apparatus. When in gear, the table top may not be manually moved.

Reference should be had to Figures 2, 3 and 6, for the purpose of understanding the mechanical means employed for control purposes and in association with the several circuits used in this apparatus. The device is so arranged that the table top 31 may pass directly from the Trendelenberg to the vertical position if the mechanical control lever is properly set; the table top 31 may pass directly from the vertical to the Trendelenberg position if the control lever is set as is required for moving in the opposite direction; but the device may be arranged so that the table top may be made to stop at the horizontal position when moving downwardly and when so stopped, may be reversed to move to vertical by merely reversing the hand switch. The top always stops when the Trendelenberg position or the vertical position is reached.

The automatic stops are arranged through the employment of a lever shown in detail in Figure 3 and of a contact box, a section of which is shown in Figure 6, and a plurality of mercury switches or their equivalents arranged upon a board in the fashion shown in Figure 7, such switch supporting board being disposed on gear segment 50.

In the contact box 90, it will be noted that there are three pairs of contacts, 90a, 90b and 90c, one superimposed upon the other, and all adapted to be opened or closed by actuation of a plunger 91 having a plurality of spaced collars 92, shown at the right hand side of Figure 6. Another pair of contacts 90d is arranged in substantial parallelism with the three pairs of contacts 90a, 90b, and 90c just referred to. At the left hand side of the contact box 90 as shown in Figure 6 is a second plunger 93 having a collar 94 which is adapted to close the single pair of contacts 90d. It will be noted that the contacts 90d adapted to be closed by this second referred to plunger 93 are arranged to close one of the circuits which is closed by the pair of contacts designated 90c.

It is highly desirable that the member controlling the several circuits opened and closed by actuating the two plungers just described shall also provide a mechanical control or locking device for the table top 31. Particular reference is again directed to Figure 3.

The small numerals 1, 2 and 3 in juxtaposition to the full line and dotted positions of the lever member 95 at the right hand side of Figure 3 are used to illustrate the positions which such controlling means should occupy for obtaining the diversity of operation hereinbefore described.

In order to understand the manner of operation of the device, it should be noted that at the end 33 of the table top 31 is a pair of levers 95, one being disposed at each side of the table end 33. These are pivoted upon the under side of the table top 31 and ride upon machine screws, or other suitable fastening and supporting members. Intermediate the two levers which are arranged to operate in parallelism is a connecting bar 96. Said bar 96 is pivotally connected at its ends to said levers 95.

For locking the table top 31 into an immovable horizontal position, the levers 95 are placed in the position shown in the dotted lines in Figure 3 and identified by the numeral "1". When in such horizontal position, the short end of levers 95 engages upon a lug or arm 97 projecting outwardly from the frame member 20, as shown in Figure 4. In this position, all circuits to motor 57 are open.

When in the position indicated by the numeral 2 and appearing in the full lines in Figure 3, the levers 95 are so arranged that the cross bar 96 engages the plunger 93 in the contact box shown in cross section in Figure 6, and closing the contacts 90d. This means that but one of the circuits in the table structures is closed, the others being open, and that table top can be moved electrically but not in the same manner as when the three contacts 90a, 90b and 90c are closed. It can not be moved below the horizontal when in position "2". If at this point the levers 95 are moved to position 1, the table top is electrically and mechanically locked against movement.

When in the position shown in the dotted lines and identified by the numeral "3" used in Figure 3, the two levers 95 are moved to their extreme right hand position (relative to Figure 3) and the table top 31 may be moved in opposite directions from the extreme vertical to Trendelenberg.

The switches shown in Figure 7 by the arrangement of circuits in relation thereto are adapted to arrest the movement of the table only when the vertical position is reached on the one hand, and the Trendelenberg or the horizontal position on the other hand. The cross bar 96 in the position shown in the dotted lines indicated by the numeral 3 engages the plunger 91 actuating the three pairs of contacts (90a, 90b and 90c) concurrently and causes said contacts to impinge one upon another, closing a plurality of circuits used in connection with the table and as previously indicated, permitting of operability of the table top freely between its two extreme positions. Mercury contact switches arrest the flow of current to motor 57 when the table reaches about 2° from its extreme positions.

In Figure 5, a means for locking the table in the Trendelenberg position is shown. This comprises a leg or arm 98 depending upon the end member 20 and projecting inwardly as is made clear in Figure 1 for impinging contact with the levers 95 referred to. When moved away from position 3, the levers 95 mechanically engage the member 98 and prevent displacement. Incidentally an electrical lock is also thereby produced.

In Figure 8, a diagram of the circuits used upon the table appear. The position of the contacts in box 90 in such figure is such that the table top may be moved upwardly.

Power for operating the table may be obtained from any commercial line. The source of power in Figure 8 is indicated by the words "line 1" and "line 2". Suitable fuses marked F are arranged in the conduits line 1 (L1) and line 2 (L2) as is common. Line 1 runs directly from the source of power to a terminal 101 of a manually operated switch 100 having terminals 101, 102, 103, 104, 105 and 106. Line 2 runs directly from the source of power to one terminal of the high resistance winding of the motor 57. A second line runs from the other terminal of said high resistance winding to contact 103 in switch 100.

From terminal 102 of the switch 100 a line runs to another of the contact 104 in said switch 100. A line from contact 104 of said switch connects with the low resistance winding of motor 57, and terminates either in the paired contacts marked 90c or the paired contacts marked 90d. It is at once apparent that the flow of current is the same whether it passes contacts 90c or 90d.

A line runs from contacts 90c or 90d to what will be called the Trendelenberg mercury contact 108. From this contact, two lines are provided for the current to flow back to contact 105 in switch 100. One is through contacts 90b and the other through the mercury switch designated the "horizontal" mercury switch, 107.

From contacts 90d, a line runs to the vertical mercury switch 109, this line also being electrically connected to the line running from contacts 90c and 90d to the Trendelenberg and horizontal mercury switches, 108 and 107. From the vertical mercury switch 109 a conduit runs to contact 106 in switch 100, such circuit being established either through an interlocking mercury switch 110 or paired contacts 90a.

Across the high resistance winding of the motor is a conduit running to the solenoid 66. Whenever current passes through the motor 57, it actuates the solenoid 66 to move the armature 67 whereby the brake upon said motor 57 is released as has been heretofore pointed out.

There are therefore three positions which the contacts in the box 90 may occupy. In one position all of the paired contacts, 90a, 90b, 90c, and 90d, are open. In a second position, the contacts on the lowermost pair of contacts 90d are closed. The other paired contacts, 90a, 90b and 90c, are apart. In a third or the Trendelenberg position, the contacts of the three pairs of contacts in alignment, 90a, 90b, 90c, are closed and the lowermost pair of contacts 90d, are separated.

By reference to Figure 8, a complete understanding of these several circuits employed in the apparatus will be obtained. The table top 31 is adapted to be motor driven from the Trendelenberg position to the vertical or to any intermediate position. When in the Trendelenberg position, the operator should be able to adjust the controls for the movement of the table top so that the table top 31 may pass to the vertical position and there stop, or to any selected position between the horizontal and the vertical, in which selected position the stoppage of movement of the table top 31 should be manually controlled.

When the table is in a horizontal position and locked therein, the operator should be unable to move it in any direction without first adjusting the controls to permit of movement downwardly or upwardly as may be desired. The locked position described is that indicated by the numeral "1" in Figure 3.

When in the Trendelenberg or vertical position the circuits should be such that the table may be moved at the will of the operator in one direction only. If the top 31 is in the Trendelenberg position, the circuits should be such that movement upwardly only can be had, while if the table is in a vertical position, the switches and other controls should be so arranged that the movement of the table top 31 is limited to a direction toward the horizontal or Trendelenberg.

The diagram contained in Figure 8 shows the four sets of paired contacts 90a, 90b, 90c and 90d, and also the four mercury switches 107, 108, 109 and 110 as have been previously described. In the table as made, the four mercury switches are disposed in close proximity one to another and at the side of the table top 31 and the paired contacts at one end thereof, while in the diagram the paired contacts and mercury switches would appear to be widely separated. This separation is merely for illustrative purposes and to facilitate an explanation of the several circuits.

Taking the table top 31 in the Trendelenberg position with the operator having a desire to move the table top to the vertical or to some position above the Trendelenberg but short of the vertical, the operator will set the levers 95 in the position indicated in Figure 3 by the numeral "3". Cross bar 96 then presses the outer plunger 91 in the contact box 90 and closes paired contacts 90a, 90b and 90c. Current force may now flow when the switch 100 is in the position shown in the full lines in Figures 8. From line L1, the path of the current is to contact 101 of switch 100, to contact 102 therein, to contact 104 therein, from contact 104 through the low resistance windings in the motor 57 through contacts 90c to the intersection of the wiring adjacent contacts 90c and 90d. As contact 105 on the switch 100 is open, the current must necessarily flow (figuratively) upwardly through the mercury contact switch 109 and through the paired contacts 90a to contact 106 of switch 100, from contact 106 to contact 103 of said switch 100, through the high resistance windings of the motor 57 back to line L2.

This completes the circuit and the table may be moved from the Trendelenberg position which is the lowest position which it may assume, to the vertical or to any point selected by the operator intermediate these two extremes. Two degrees short of the vertical the mercury contact switch 109 opens and the table comes to a stop, and current no longer can flow through the circuit just described or through any other circuit, so long as the switch 100 is in the position shown in the solid lines of Figure 8.

There is only one movement which the table can make from the vertical. That movement is downwardly. If the operator desires to run the table to the Trendelenberg position or to some position lower than horizontal, he changes the position of switch 100 to that shown in dotted lines in Figure 8, whereupon the flow of current is through line L1 to contact 101 of switch 100, to contact 105 of switch 100, from whence the current may flow in two paths to the mercury contact 108, marked "Trendelenberg".

The first path of the current would be through paired contacts 90b while the alternative course would be through the mercury contact switch 107 marked "horizontal". From the Trendelenberg mercury contact switch 108, the current flows through paired contacts 90c to the low resistance winding of the motor 57 from thence to contact 104 of switch 100, to contact 103 of said switch 100, through the high resistance windings of the motor 57, and back to line L2. Just two degrees short of Trendelenberg the switch 108 opens and the table top stops. When the contacts 90a, 90b, and 90c are closed as they are when the lever 95 is in the position marked "3" of Figure 3, reversal of the switch 100 permits the operator to cause the table to move from one extreme position (Trendelenberg) to the other (vertical), the direction of the movement of the table being wholly controlled by the position of the switch 100.

Should the operator desire to move the table top from the Trendelenberg position or any position below the horizontal to the horizontal, he must place the lever 95 in position "3" of the Figure 3. Position 2 establishes no circuit below the horizontal position. This position of levers 95 closes paired contacts 90d only. The flow of current from line L1 beyond contacts 90d when contacts 90d only are closed is arrested at mercury contact switch 110.

The interlocked mercury switch 110 is disposed at an angle so that the contact therein is broken the instant the table top 31 passes below the horizontal and it remains open beneath the horizontal.

To move the table top 31 upwardly from the horizontal position to the vertical, the same position of contacts 90a, 90b, and 90c already described may be assumed but this change can also be accomplished by placing the levers 95 in position "2" of Figure 3. This is the only time the interlock switch 110 serves to establish a circuit.

The flow of the current is from line L1 to contact 101 of switch 100, to contact 102 of switch 100, to contact 104 of said switch, through the low resistance windings of motor 57, through the paired contacts 90d, through the mercury switch 110 marked "interlock" to contact 106 of switch 100, to contact 103 in said switch, to the high resistance windings of motor 57, to line L2. At two degrees removed from the vertical, mercury contact switch 109 opens to arrest upward movement.

With the levers in position "2" of Figure 3, the table top 31 may be moved from any position above the horizontal downwardly to the horizontal by moving the switch 100 to its dotted line position, the circuit comprising line L1, contact 101 of switch 100, contact 105 thereof, horizontal mercury switch 107 through Trendelenberg mercury switch 108, paired contacts 90d, the low resistance motor windings, contact 104 of switch 100, contact 103 thereof, and through the high resistance motor windings to line L2. The horizontal mercury switch 107 opens at two degrees above the horizontal, allowing the table to reach the horizontal position by the momentum which it has obtained as an incident to its downward movement. No further motor driven movement is permissible while the levers 95 are in position "2".

It is quite manifest that the purpose of the interlock mercury switch 110 is to permit the movement of the table top 31 from the horizontal to the vertical. This mercury switch 110 is set at an angle of about two degrees difference from the horizontal mercury switch. It establishes the circuit only between the vertical position and the horizontal, and is open the instant the table top 31 passes below the horizontal position.

In connection with the circuits is a secondary circuit to brake solenoid 66. Whenever current flows through the several circuits which have been described, it necessarily flows through the brake solenoid circuit, whereby the brake upon the motor 57 is released and the motor 57 allowed to rotate freely. The instant electromotive force is shut off, or a circuit broken, current is removed from the brake solenoid, and the spring in combination with the brake forces the brake against the motor 57, instantly stopping said motor and preventing the movement of the table in any direction until current is again fed to its circuits, or the motor connections are thrown out of gear.

Briefly reviewed, the table top 31 cannot be actuated when the levers are in the position "1" of Figure 3. When in the position indicated in "2" of Figure 3, the table top 31 may be moved intermediate the vertical and horizontal positions. In position "3" of Figure 3, the table is adapted to be moved from the vertical to the Trendelenberg position, or vice versa, with no automatic stopping provided except at the extreme end of the circuits of movement.

The levers 95 mechanically lock the table top 31 when in the Trendelenberg position when in position "2" of Figure 3; and they mechanically lock the table top 31 in a horizontal position when disposed as is indicated by the numeral "1" of Figure 3.

Having thus described my invention, what I claim is new and desire to secure by Letters Patent of the United States is:

1. X-ray apparatus comprising a support, patient supporting means mounted for pivotal movement on said support, a motor and means connecting said motor with said patient supporting means for pivoting the latter between predetermined positions, a first circuit including a plurality of contacts, said motor, a gravity switch for breaking the circuit when the supporting means approaches its vertical position, and a manual switch, a second circuit including a plurality of contacts, said motor, a gravity switch for breaking the circuit when the supporting means approaches its Trendelenberg position, and said manual switch, said manual switch and contacts in said first circuit upon closure thereof causing the motor through said connecting means to tilt the patient supporting means from the Trendelenberg position to a substantially vertical position, and said manual switch and contacts in said second circuit upon closure thereof resulting in a tilting of the patient supporting means from a vertical position to a substantially Trendelenberg position.

2. X-ray apparatus comprising a support, patient supporting means mounted for pivotal movement on said support, a motor and means connecting said motor with said patient supporting means for pivoting the latter between predetermined positions, a first circuit including a plurality of contacts, said motor, a gravity switch for breaking the circuit when the supporting means approaches its vertical position, and a manual switch, a second circuit including a plurality of contacts, said motor, a gravity switch for breaking the circuit when the supporting means approaches its Trendelenberg position, and said manual switch, a third circuit comprising a plurality of contacts, said motor, a gravity switch for breaking the circuit when the supporting means approaches a horizontal position, and said manual switch, said manual switch and contacts in said first circuit upon closure thereof causing the motor through said connecting means to tilt the patient supporting means from the Trendelenberg position to a substantially vertical position, said manual switch and contacts in said second circuit upon closure thereof resulting in a tilting of the patient supporting means from a vertical position to a substantially Trendelenberg position, and said manual switch and contacts in said third circuit upon closure thereof causing the motor through said connecting means to tilt the patient supporting means from its vertical position to such horizontal position.

3. X-ray apparatus comprising a support, patient supporting means mounted for pivotal movement on said support, a motor and means connecting said motor with said patient supporting means for pivoting the latter between predetermined positions, a first circuit including a plurality of contacts, said motor, a gravity switch for breaking the circuit when the supporting means approaches its vertical position, and a manual switch, a second circuit including a plurality of contacts, said motor, a gravity switch for breaking the circuit when the supporting means approaches its Trendelenberg position, and said manual switch, a third circuit comprising a plurality of contacts, said motor, a gravity switch for breaking the circuit when the supporting means approaches a horizontal position, and said manual switch, a fourth circuit comprising a plurality of contacts, said motor, a gravity switch closing the circuit so long as the supporting means is above its horizontal position, a gravity switch for breaking the circuit when the supporting means approaches its vertical position, and said manual switch, said manual switch and contacts in said first circuit upon closure thereof causing the motor through said connecting means to tilt the patient supporting means from the Trendelenberg position to a substantially vertical position, said manual switch and contacts in said second circuit upon closure thereof resulting in a tilting of the patient supporting means from a vertical position to a substantially Trendelenberg position, said manual switch and contacts in said third circuit upon closure thereof causing the motor through said connecting means to tilt the patient supporting means from its vertical position to such horizontal position, and said manual switch and contacts in said fourth circuit upon closure thereof resulting in the tilting of said patient's support from its horizontal position to a substantially vertical position while said first circuit remains open.

JULIUS B. WANTZ.